Jan. 1, 1946.   E. LEMMERS   2,392,095
LIGHT FILTER
Filed Oct. 16, 1943
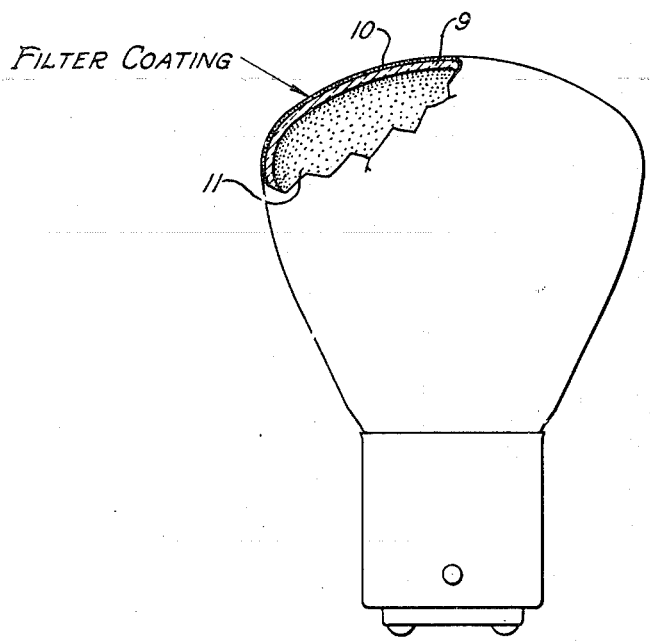
Inventor:
Eugene Lemmers,
by John H. Anderson
His Attorney.

ＵＮＩＴＥＤ ＳＴＡＴＥＳ ＰＡＴＥＮＴ ＯＦＦＩＣＥ

2,392,095

LIGHT FILTER

Eugene Lemmers, Cleveland Heights, Ohio, assignor to General Electric Company, a corporation of New York Application October 16, 1943, Serial No. 506,577

3 Claims. (Cl. 88—109)

This invention relates to filters for light or other radiation. For various purposes, it is often desirable to modify the radiation from a source such as an electric lamp by eliminating unwanted components of its radiant output: e. g., it may be desired to eliminate all light except one desired color from the output of a tungsten filament incandescent lamp, or of a discharge lamp such as a mercury or sodium vapor lamp; or it may even be desired to eliminate all visible light from the output of a source that is rich in ultraviolet, such as a high-pressure mercury vapor lamp, or a fluorescent lamp of low-pressure mercury vapor type.

Heretofore, many filters for such purposes have been made of glass of suitable absorptive properties, and it has been proposed to make electric light bulbs of such glass, or to apply the glass as a thin coating or glaze on the vitreous bulb or transmissive enclosure of a light source. Similar effects have also been sought by coating transmissive light-source enclosures with dyed gelatine or lacquer films or the like. However, the use of colored glass or glazes in lamp bulbs has been found to entail costly methods of manufacture—to say nothing of the drawback of stocking bulbs of many different glasses, each only usable for one particular purpose. Dyed coatings of gelatine or other lacquer have also been found subject to various drawbacks, such as difficulty in securing dyes that give the desired transmission efficiently, and liability of dyes and lacquers to changes or reactions (under heat or other radiation to which they are intensively subjected in use) that modify the original transmission of the dyed lacquer unfavorably.

I have found a way of overcoming these difficulties and drawbacks by using filter material of the desired absorptive and transmissive properties in a state of fine division in a binder of suitable transmissive properties, like pigment particles in paint. Generally, I have found, such compositions are characterized by prohibitively low transmission, even though their components separately show good transmission; but I have overcome this by combining filter glass and binder whose indices of refraction are substantially alike for the wavelength(s) that it is desired to transmit. The invention has proved especially useful in a "dark-light" filter intended to transmit the ultraviolet from a source that also produces a substantial amount of unwanted visible light, such as a fluorescent lamp that is commercially known as the "RP12," in which the phosphor described in U. S. Patent 2,306,567 to Roberts, granted December 29, 1942, is excited by shortwave ultraviolet from a low-pressure mercury vapor discharge; and I have hereinafter explained the practical carrying out of the invention with particular reference to this use. Various features and advantages of the invention will become apparent from the description of species and forms of embodiment, and from the drawing.

The single figure of the drawing is a side view of a fluorescent lamp of mercury vapor discharge type having a pear-shaped bulb, a portion of the bulb-wall being broken out and in section to allow of showing more clearly an external filter coat embodying my invention.

The drawing shows a fluorescent lamp L of the type commercially known as "RP12" having on its bulb wall 9 an external filter coating 10 embodying the present invention. The usual internal phosphor coating 11 on the lamp bulb or envelope 9 also appears where the bulb wall is in section. In the absence of the filter coat 10, the RP12 lamp with a bulb 9 of the usual clear lime or lead glass yields ultraviolet radiation of wavelength ranging from about 3200 A. to 4000 A. and peaking at about 3650 A., together with a substantial amount of visible light whose apparent color is blue or bluish. In general, the purpose of the filter coat 10 is to transmit or pass as large a proportion of the wanted radiation as may be, while substantially suppressing or minimizing the unwanted radiation to such a degree that the residue thereof is practically unobjectionable. For dark light illumination, as it is called, the aim is to suppress the visible light and to pass the ultraviolet as much as possible. For the particular example hereinafter described, the wanted radiation is particularly that of about 3600 A. wavelength.

In accordance with my invention, the filter coat 10 is a "paint," as it were, in which the "pigment" consists of finely divided particles of filter material adapted to absorb the unwanted radiation and to transmit the desired radiation; while the binder which forms the rest of the coat 10 may transmit both wanted and unwanted radiation, since its main purpose is merely to hold the filter particles on the bulb wall 9. Of course the binder should be as stable as possible at temperatures attained by the bulb wall 9 in service, and under the incident radiation of the lamp L, and should freely transmit the desired radiation. If it absorbs any of the unwanted radiation to a substantial degree, this is so much the better—although such is not the case with otherwise advantageous binders hereinafter particularly mentioned. The filter particles in coating 10 may consist of transparent vitreous or glassy filter material such as would in itself be suitable for the bulb wall 9, or for a glaze thereon, as hereinbefore described. Preferably, the filter glass should be reduced to a finely divided state by mechanical breaking, crushing, and grinding, rather than by quenching, since quenching results in minutely fissured fine particles that show poor transparency, and may also prove irregular in refractive properties. The finer the size of the filter particles, the better. The filter glass and the binder should correspond as closely as possible in their indices of refraction for the radiation band that is to be transmitted. Outside of this band, differences in their refraction indices are more or less inconsequential, and may even contribute to reduce unwanted transmission by the coating 10; however, I at present prefer to rely on absorption by the filter particles for the suppression of unwanted radiation, rather than on differences in refraction. In practice, this may call for filter glasses specially compounded to give indices of refraction that match those of practically suitable binders.

For a dark-light filter coating 10, a suitable filter glass is one of the nickel-cobalt type having an index of refraction of about 1.585 to 1.595; while suitable organic binders or lacquer bases are exemplified by transparent synthetic resins, such as Bakelite of cast phenolic grade having a refractive index of about 1.5 to 1.7, polystyrene with a refractive index of about 1.59, and methyl methacrylate (such as that marketed under the name of "Lucite") with an index of about 1.5—although this last is rather low to be easily matched in commercial filter glasses. These indices of refraction represent determinations by visible light; but the indices for long-wave ultraviolet would stand in about the same relations to one another, and even approximate these values rather closely. The polystyrene which I have used in the compositions hereinafter described is that known commercially as "Lustron P2002 Crystal," marketed by Monsanto Chemical Company. Suitable polystyrene solvents for compounding the lacquer binder are exemplified by commercial amyl acetate, butyl acetate, or low-boiling hydrogenated products consisting of naphthas and petroleum distillates containing cyclic hydrocarbons, such as that marketed by the Standard Oil Company of New Jersey as "Solvesso No. 1," which boils in a range of about 93° C. to 135° C., and has substantially or approximately the following percentage composition:

Toluene _____ 65
Naphthalene _____ 5
Straight chain hydrocarbons _____ 30

A mixture of 40 per cent butyl acetate with 60 per cent Solvesso, by weight, is very suitable.

The filter glass for the coating composition or "paint" may first be crushed in a recess of a steel block by means of a steel plunger hammered on its upper end. The resulting material may then be milled in an agate mortar with an agate pestle, which may be motor driven. This milling may either be done dry, or with the glass wet with the polystyrene solution hereinafter described. The particle size of the product may be of the order of some 1 to 5 microns—the smaller the better. If milled dry, the powder may be sieved through a screen of some 200 mesh to get rid of insufficiently reduced particles. To combine the polystyrene solution with the glass, either before or after the fine grinding or milling of the latter, some of the polystyrene solution may be poured on the particles of glass in a dish and allowed to soak in by capillarity during a period of an hour or more, after which the rest of the polystyrene solution may be added and stirred in. The preferred consistency of the paint (determined by the proportions of glass, polystyrene, and solvent) may vary according to how it is applied to the lamp bulb, including the number of coats applied. The practical limit on the proportion of glass to polystyrene itself in the paint (disregarding solvent) is that the paint should dry glossy, rather than matte, since a matte coating has a poorer efficiency of transmission than a glossy coat; but if the coating does dry matte, this can be remedied by varnishing it over with enough clear polystyrene solution to fill the surface voids and give a glossy surface. A fairly satisfactory thickness of the glossy coating is of the order of 40 mils, which may either be attained in a single coating, or built up by a plurality of coats, each allowed to dry well before application of the next coat over it. Very good results can be attained by building up a 40 mil coating by several applications of paint containing a low concentration of pigment: e. g., such a coating may show an ultraviolet transmission of 25 to 30 per cent, and may let through visible light in a proportion as low as about 5 per cent of the transmitted ultraviolet.

However the paint is applied and the desired thickness of coating attained, the coating must be allowed to dry out or cure thoroughly, since its properties do not become stabilized until the solvent is entirely gone. So long as the solvent is present in substantial proportion, it so affects the index of refraction of the binder that the ultraviolet transmission is greatly lowered. As much as a week's drying has sometimes been necessary to get rid of all the solvent. If the ultraviolet transmission reaches a maximum and then declines during drying, this indicates that the index of refraction of the glass does not match that of the polystyrene properly. Even after complete drying, the refractive index of the polystyrene and the transmission of the filter may be somewhat affected by heating as much as 20° above the standard atmospheric room temperature of 20° C.

One suitable composition for the paint is as follows:

Ground glass (ground dry) _____ g__ 50
Polystyrene _____ g__ 50
Butyl acetate _____ cc__ 200

As a preferred way of compounding this paint, 50 g. polystyrene may be dissolved in 100 cc. butyl acetate, and 50 g. crushed glass may be ball milled with 50 cc. butyl acetate in a 1 quart ball mill, using flint pebbles, until all the glass is ground fine enough. This product is mixed with the polystyrene solution, the ball mill is rinsed out with 50 cc. butyl acetate, and the rinse is added to the said mixture and thoroughly mixed with it. If necessary at any time, the paint may be thinned with butyl acetate.

One way of applying the paint to a bulb 9 is by dipping the bulb in the paint; a better way is to spray the bulb with the paint, since this gives an even coating with less liability of thick places due to drainage of surplus paint during drying.

On a flat surface—such as a plane glass wall of an enclosure surrounding a lamp bulb—the paint may be applied either by spraying, or by pouring it on the wall while the latter is horizontal and allowing it to spread naturally under the influence of gravity.

The filter particles may consist of glass containing oxides that absorb radiation of undesired wavelengths, and also, if necessary, ingredients for modifying or adjusting the index of refraction to agree with that of the binder for the band of wavelengths to be transmitted. For this purpose, ordinary ultraviolet glass batches may be used, with addition of cobalt or nickel oxides or both for absorbing unwanted visible light, in the case of glass for a dark-light filter, and of barium oxide especially for controlling and adjusting the index of refraction. The coloring oxides such as those of cobalt and nickel also affect the refractive index, but to a less degree than barium oxide. Other things being unchanged, increasing the barium oxide raises the index of refraction. The actual composition of the glass for any particular binder may vary considerably, as is illustrated by the following examples of the compositions of glasses suitable for use with a polystyrene binder in a dark-light filter for an RP12 lamp:

Of course the properties and composition of the filter glass used may vary according to the conditions of service: for example, when glass capable of filtering out part of the unwanted radiation intervenes between the observer and the object illuminated, the filter associated with the light source may let through this part of the unwanted radiation.

What I claim as new and desire to secure by Letters Patent of the United States is:

1. A dark-light electric lamp envelope formed of vitreous material permeable to both visible and ultraviolet radiation and coated with a filter coat consisting essentially of fine vitreous particles which are substantially impermeable to visible light, but permeable to ultraviolet, held in a lacquer layer that is also permeable to ultraviolet and has substantially the same ultraviolet index of refraction as said vitreous particles.

2. A glossy-surfaced dark-light filter consisting essentially of fine particles of mechanically comminuted filter glass that are substantially impermeable to visible light, but permeable to ultraviolet, held in a layer of resin that is also permeable to ultraviolet and has substantially the same ultraviolet index of refraction as said glass particles.

| $SiO_2$ | $As_2O_3$ | $Al_2O_3$ | $ZnO$ | $CaO$ | $Li_2C$ | $Na_2O$ | $K_2O$ | $B_2O_3$ | $Co_3O_4$ | $Ni_2O_3$ | $BaO$ |
|---|---|---|---|---|---|---|---|---|---|---|---|
| 23 | 0.3 | 2 | 8 |  | 2.5 | 10 |  | 21 | 2 |  | 25 |
| 41 | 0.2 | 2 | 8 |  |  |  | 16 |  |  |  | 27 |
| 39 | 0.2 | 2 | 8 |  |  | 16 |  |  | 3 |  | 32 |
| 49 | 0.2 | 2 | 8 |  |  | 16 |  |  | 3 |  | 22 |
| 41 | 0.2 | 2 |  |  |  | 20 |  |  | 2 |  | 35 |
| 39 | 0.2 | 2 | 8 |  |  | 16 |  |  | 5 |  | 30 |
| 38 | 0.2 | 2 | 8 |  |  | 12 |  |  | 4 | 2 | 30 |
| 37 | 0.2 |  | 4 | 2.5 |  | 13 | 4 | 4 | 3 | 3 | 30 |
| 40 | 0.2 |  | 4 | 2.5 |  | 13 | 4 | 4 | 3.5 | 3.5 | 25 |

Of course any batch ingredients and proportions which will actually give glasses of these compositions may be used in practice. For example, the aluminum oxide and zinc oxide in this series of glasses are not really essential to the purpose of the invention, though practically advantageous as glass ingredients; and proportions of barium oxide exceeding the 35 per cent maximum in this series might be used to attain a desired high index of refraction.

3. A dark-light filter paint of polystyrene lacquer and suspended particles of filter glass that contains oxide of metal of the group consisting of nickel and cobalt and is thereby rendered substantially impermeable to visible light, but is permeable to ultraviolet and has substantially the same ultraviolet index of refraction as the polystyrene when the latter has dried out.

EUGENE LEMMERS.